Sept. 17, 1968   G. V. CREMIEUX   3,401,832
ARTICLE SORTING AND FEEDING APPARATUS
Filed Dec. 5, 1966   3 Sheets-Sheet 1

Inventor
George V. Cremieux
By
Attorney

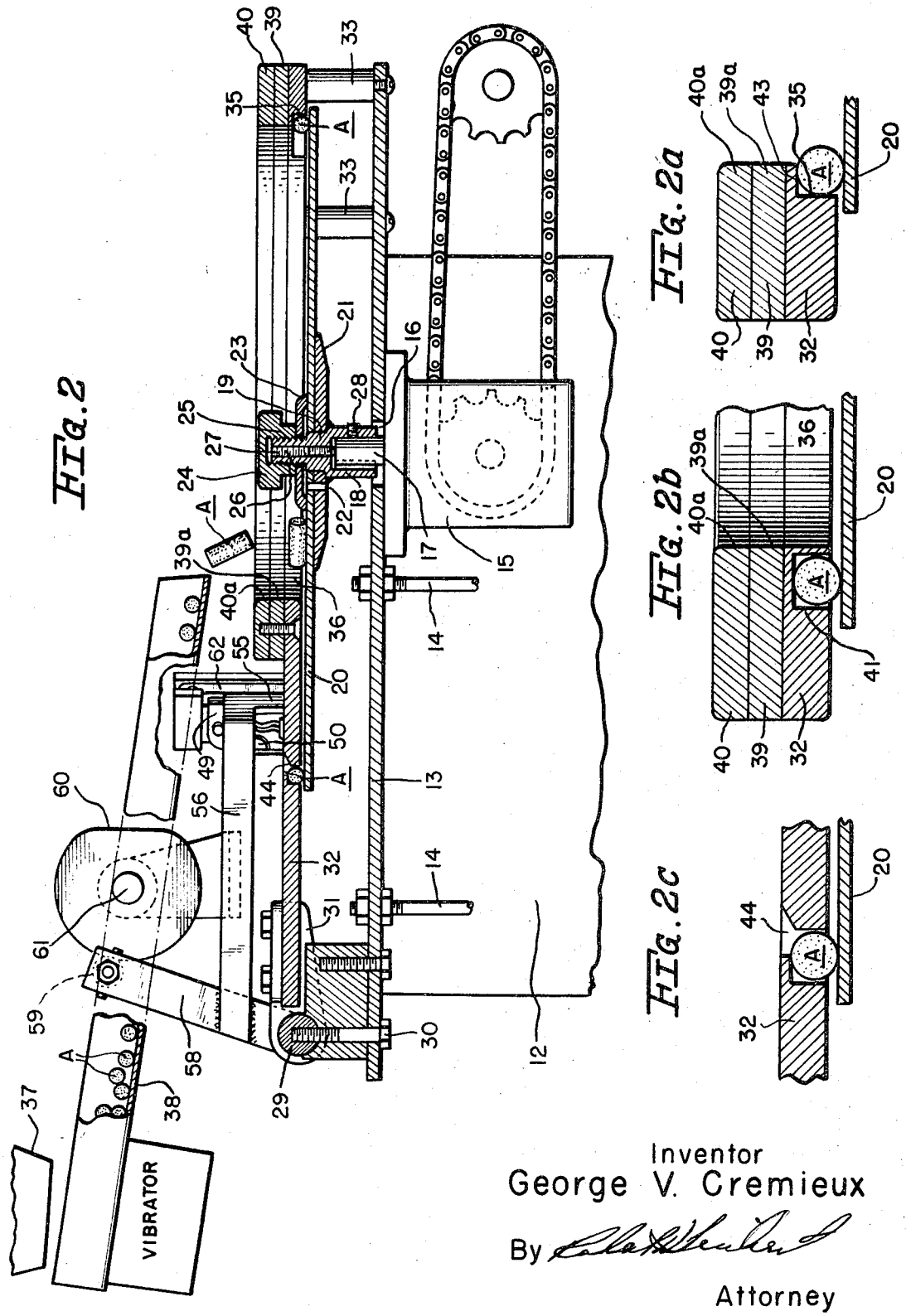

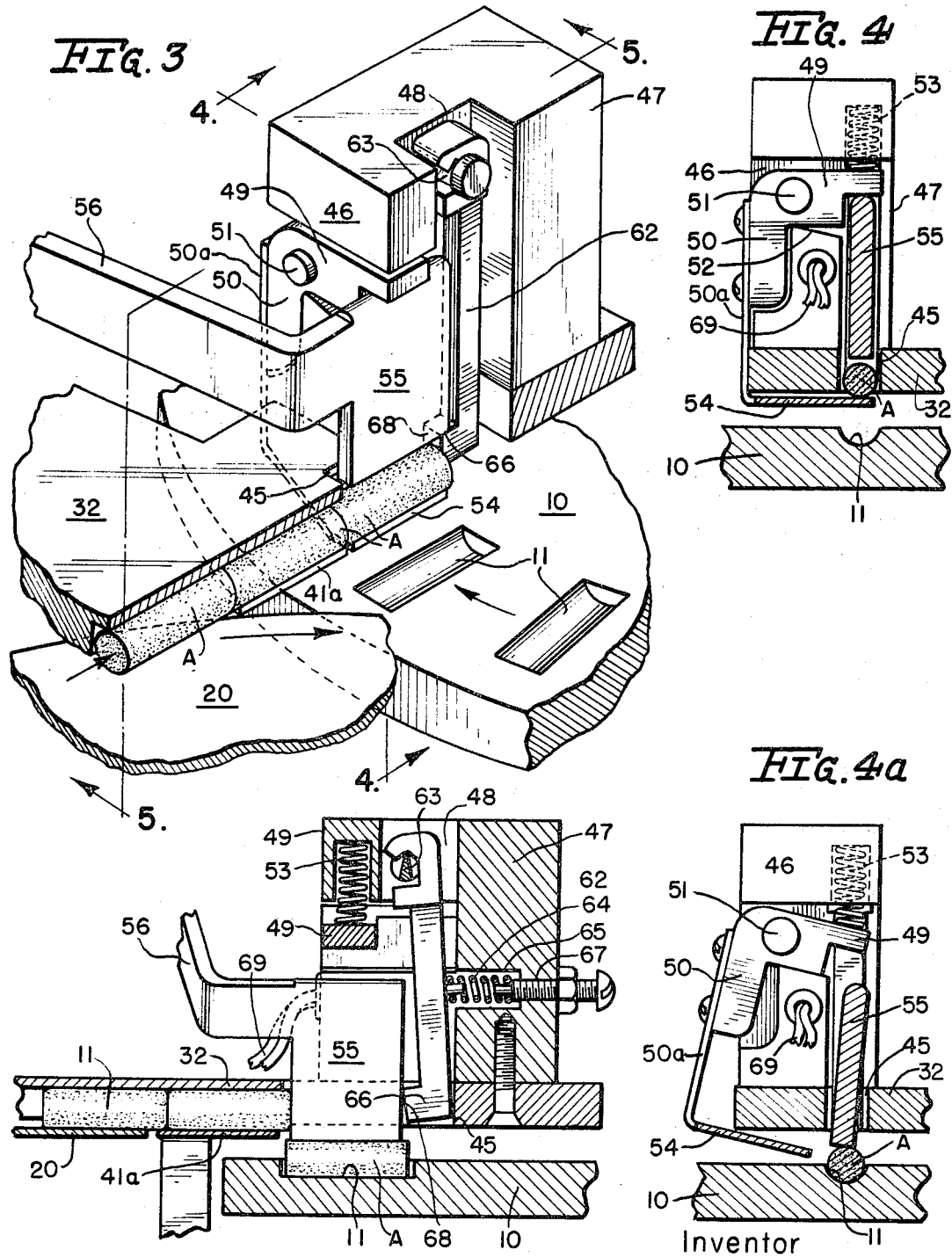

United States Patent Office  3,401,832
Patented Sept. 17, 1968

3,401,832
ARTICLE SORTING AND FEEDING APPARATUS
George V. Cremieux, Elkhart, Ind., assignor to American Home Products Corporation, New York, N.Y., a corporation of Delaware
Filed Dec. 5, 1966, Ser. No. 599,197
10 Claims. (Cl. 221—175)

ABSTRACT OF THE DISCLOSURE

Article sorting and feeding apparatus in which a rotating turntable drives articles against a retaining wall in non-concentric relation to the axis of rotation of the turntable so as to cause said articles to enter a guideway leading to a discharge station while the articles are supported on a portion of the turntable travelling outside the confines of said wall and having means for controlling release of said articles, one at a time, upon arrival at said discharge station.

---

The present invention relates to an article sorting and feeding apparatus having a discharge station to which a series of articles are advanced and on arrival are successively halted pending action of a periodically operating discharge assistant to feed said articles to an article receiving member in alignment with said discharge station.

More particularly, in an apparatus incorporating the features of this invention, said articles are prepared for such advance movement to said discharge station by means of a rotating turntable having an area thereof within the confines of an enclosing wall against which said articles are driven by centrifugal force to group said articles in lined-up end-to-end relation, said while so grouped said articles are fed to said discharge station via a guideway leading from the area within said enclosing wall to said discharge station while said articles are supported on a portion of the turntable travelling outside the confines of said enclosing wall.

The apparatus of this invention is especially suitable for use with an article wrapping unit wherein the receiving member is a rotating carrier having a series of article receiving cavities, and the carrier is rotated in timed relation with operation of the discharge assistant of the article feeding unit to successively locate said cavities in article receiving position in alignment with the discharge station of said feeding unit, and while occupying a cavity on said carrier the article is ultimately transferred to the article wrapping area of the article wrapping unit.

These and other objects and advantages of the present invention will be more readily apparent from a description of the drawings in which:

FIG. 2 is a side elevational view of the apparatus shown in FIG. 1.

Figure 1:
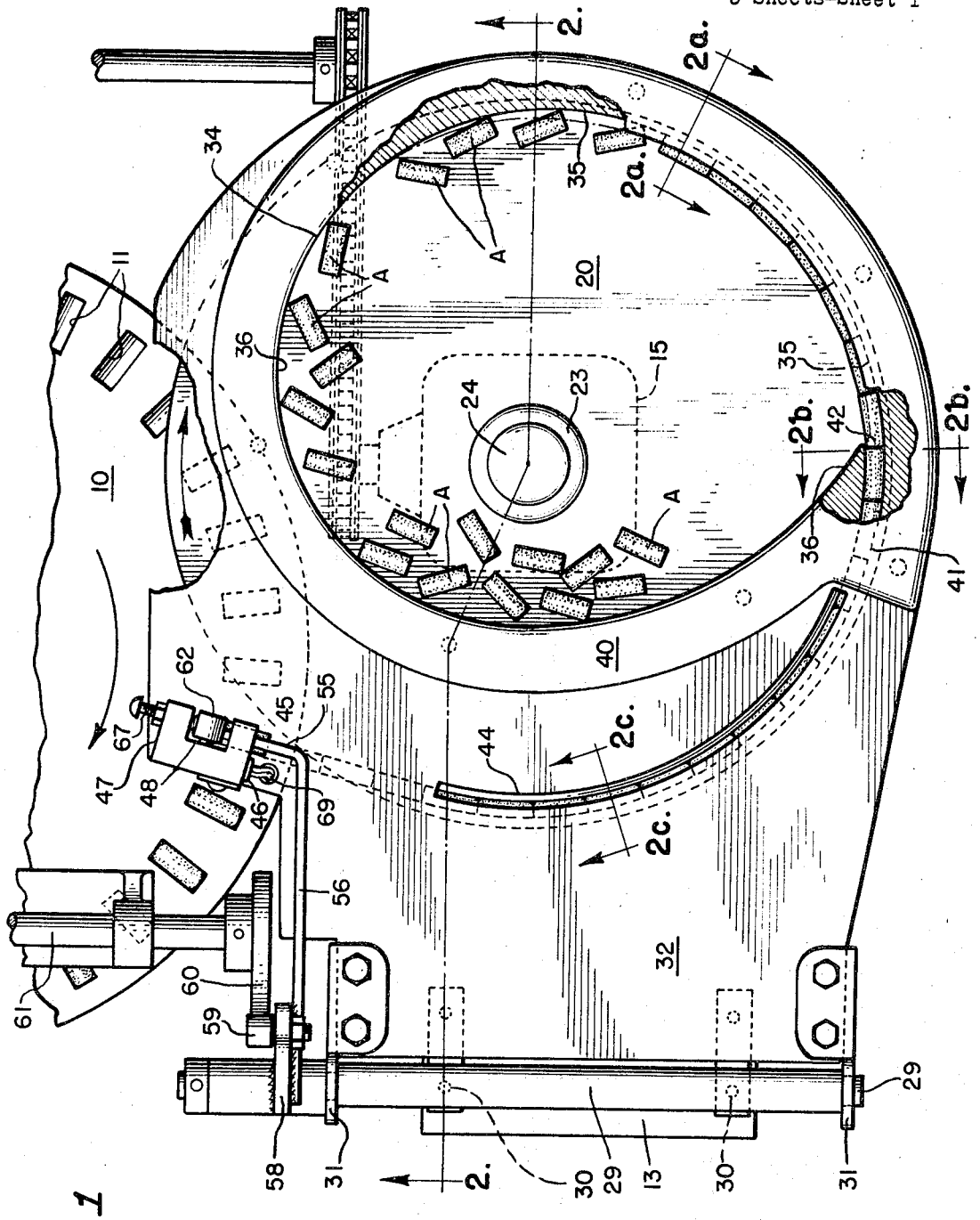
FIG. 1 is a top plan view of a sorting and feeding unit incorporating the features of this invention.

FIGS. 2a, 2b and 2c are enlarged fragmentary vertical sectional views taken respectively along lines 2a—2a, 2b—2b and 2c—2c of FIG. 1.

FIG. 3 is an enlarged fragmentary perspective view of the controls which act to deliver articles to the carrier of the wrapping unit from the discharge station of the sorting and feeding unit.

FIG. 4 is an enlarged fragmentary vertical sectional view, with parts in elevation, taken on line 4—4 of FIG. 3 illustrating the position of the article perparatory to its exit from the discharge station.

FIG. 4a is a similar fragmentary vertical sectional view illustrating the position of the controls while the article is undergoing deposit on the carrier of the wrapping unit.

FIG. 5 is an enlarged front view taken along line 5—5 of FIG. 3.

For the purpose of the disclosure, the invention is herein illustrated as a storting and feeding unit for rectal suppositories of elongated, generally cylindrical shape and designated by the reference character A. However, it is to be understood that a wide variety of articles of either larger or smaller size and of either round or rectangular shape may be handled by the apparatus of this invention by matching its capacity to switch sizes and shapes.

As shown in FIGS. 1 and 2 of the drawings, a sorting and feeding unit for articles A in accordance with the present invention is shown as an attachment for a conventional wrapping machine which includes a rotary carrier 10 having a series of cavities 11 each adapted to receive and hold one of the articles A preparatory to its undergoing wrapping action of the wrapping machine. A frame member of the wrapping machine defines an upright support 12 to which a horizontal platform 13 is secured by brackets 14, which platform provides a base for the unit of this invention. A power transmission unit having a housing 15 is fastened to the underside of the platform 13 opposite an opening 16 provided in said platform. A vertical drive shaft 17 coupled to said transmission unit extends upwardly through said opening 16. A hub member 18 is keyed to the shaft 17 for rotation in unison with the shaft. The hub member 18 has an upward extension 19 which is fitted within an opening formed centrally of a turntable 20. A fixed connection between the hub member 18 is established via a reinforcing collar 21 secured to the underside of the turntable 20 about the edge of the opening containing the upper end 19 of the hub member and a welded joint between the hub member 18 and said collar 21 along an upwardly facing shoulder 22 at the base of said upper end 19 of the hub member. A washer 23 is tightened against the upper face of the turntable about the upper end 19 of the hub member by means of an internally threaded knob 24 which engages threads 25 formed on the upper end 19 of the hub member. A set screw 26 acting against the upper end of the shaft 17 cooperates with an internally threaded bore 27 in the upper portion of the hub member to provide for adjusting the axial position of the hub member and turntable relative to the shaft 17. A set screw 28 acting against the portion of the shaft 17 within the hub member 18 is effective to lock the hub member 18 and turntable 20 against unintentional withdrawal from a selected axially adjusted position relative to the shaft 17. A shaft 29 secured to the shelf 13 by mounting bolts 30 presents end portions for receiving axially aligned hinge plates 31 fixed to a panel 32 whereby the latter is mounted for swinging movement relative to said shelf about said shaft 29 between a raised and a lowered position. When in lowered position, the panel 32 has downward engagement with a pair of stops 33 extending upwardly from the platform 13 so as to cooperate with the hinge plates 31 and shaft 29 in supporting the panel 32 in upwardly spaced parallel relation to the platform 13.

An area of the panel 32 facing the turntable 20 and its hub member is removed to provide an opening 34 which allows the lower face of the panel 32 to occupy a position relatively close to the upwardly facing surface of the turntable along the edge portions of said opening 34. It will be noted from FIG. 1 that the opening thus provided for exposure of the turntable 20 is bounded by continuous wall defined by a first curved edge portion 35 which substantially follows the circular periphery of the turntable 20 through an arc of approximately 90 degrees and by a second curved edge portion 36 which substantially follows the inner concave curvature of a crescent shaped figure having an outer convex curvature following the circular periphery of the turntable 20 through an arc of approxiately 270 degrees, said crescent shaped figure having a maximum radial dimension approximately half the radial dimension of the turntable. The edge portions 35 and 36 meet to form an obtuse corner at the entrance to that area below the panel 32 in which the exposed portion of the turntable 20 begins to become hidden from view. Facilities for depositing articles A on the upwardly exposed area of the turntable 20 includes an insulated hopper 37 having a bottom outlet through which the articles contained in said hopper fall on a vibratory chute 38. The chute 38 extends to a position in overhead relation to the opening 34 in panel 32 so as to feed articles A from the chute 38 to the turntable 20. Continuous rotation of the turntable via the shaft 17 causes the articles A while riding on the turntable to be hurled by centrifugal force against the wall defined by the edge portions 35 and 36 bordering the opening 34. The height of this wall is built up by means of a pair of frame members 39 and 40 having matching vertically aligned inner edge portions 39a and 40a respectively forming upward continuations of the edge portions 35 and 36 of the opening 34.

A tunnel 41 formed in the panel 32 is in communication with the area within the opening 34 via a gap 42 provided in the edge portion 36 where said edge portion 36 meets the edge portion 35 to form the obtuse corner. The tunnel 41 extends from said gap 42 in the direction of rotation of the turntable 20 along a line in overhead relation to the turntable 20 and substantially following the line of curvature of the periphery of the turntable 20. The floor of the tunnel is thus defined by the surface of the turntable facing said tunnel whereby the tunnel 41 provides a guideway in which said articles A have snug sliding fit while in end-to-end lined up relation. The tunnel 41 thus conducts the articles A from the area of the turntable within the opening 34, under force exerted by rotation of the turntable 20, to a tunnel outlet adjoining a discharge station outside the confines of the area occupied by the turntable 20, as more particularly described hereinafter. It will be observed that the edge portion 36 of the opening 34 is undercut progressively radially outwardly of the hub member 18 in the direction of rotation of the turntable 20 as indicated in FIG. 1 and as shown in FIG. 2A to define an overhead lip 43 which is horizontally coplanar with the roof of the tunnel 41 as shown in FIG. 2b. The upright surface of the undercut area of the edge portion 36 likewise forms a smooth continuation of the outermost upright wall of the tunnel 41. Accordingly the lip 43 in cooperation with the surface of the turntable 20 opposite said lip 43 aid in piloting the articles A toward the entrance to the tunnel 41 in arcuate lined-up relation for transport through the tunnel 41. The obtuse corner formed by the edge portion 35 of the opening 34 at the entrance to the tunnel 41 aids in diverting the articles A in the direction of the tunnel. A portion of the upper wall of the tunnel 41 is removed to provide a slight opening 44 through which progress of the articles A may be visibly observed while in transit within the tunnel.

A discharge station to which articles A are conducted via the tunnel 41 is defined by a slot 45 in the panel 32 in vertically aligned upward relation to the line of travel of the cavities 11 in the rotary carrier 10. The slot 45 thus provides an outlet through which an article A has passage to an article receiving cavity 11 in vertically aligned relation to said slot after the article A is advanced to the slot 45 via the tunnel 41 and the floor of the tunnel defined by the plate 41a. A dead plate 41a fixed to the frame 12 of the wrapping unit forms a floor for the portion of the tunnel 41 spanning the distance between the peripheral limits of the turntable and the slot 45.

A mounting bracket fixed to the panel 32 includes a pair of upright walls 46 and 47 joined by an upright connecting wall 48 which faces the area occupied by the slot 45. A bell crank lever having a first arm 49 and a second arm 50 has pivotal support on a pivot pin 51 projecting from the wall 46 whereby said arms have swinging movement in an upright plane in intersecting relation to the line of travel of the articles A enroute to the discharge slot 45. An offset in the wall 46 presents a stop 52 with which the arm 49 has engagement to limit downward rocking movement of arm 49 while a spring 53 secured in a seat provided in the wall 46 in overhead relation to the arm 49 of the bell crank lever acts on the latter to bias the arm 49 into engagement with said stop 52. As the arm 49 is moved from an upward position as shown in FIG. 4 of the drawing to a position in engagement with the stop 52 as shown in FIG. 4a, the arm 50 is moved in a direction away from the area occupied by the slot 45. While the arm 49 is in said upward position (see FIG. 4) a foot 54 forming the lower end of an extension 50a secured to the arm 50 occupies a forward position to provide a transitional underlying support for an article A while said article is within the confines of the discharge slot 45 and thus blocking movement of the article A in the direction of the carrier 10. When the arm 49 is in its downward position (see FIG. 4a) the foot 54 is in a retracted position in relation to the slot 45 thereby allowing movement of an article A through said slot.

Movement of the article A through the slot is assisted by a blade 55 forming an extension of a lever 56 which has rocking movement in a path parallel to the line of travel of the arms 49 and 50. Such rocking movement of the lever 56 is established by means of a pivotal support defined by an axial extension of shaft 29 on which the panel 32 has swinging movement. An arm 58 fixed to and branching upwardly and forwardly of the pivoted end of lever 56 is equipped with a roller 59 which rides the edge of a rotating cam 60 mounted on a drive shaft 61 to cause the lever 56 to rock in a direction to lift the blade 55 applies pressure on the article A thereunder so as to such upward position the blade 55 has upward engagement with the arm 49 pivoted on wall 46 of the mounting bracket thereby holding the foot 54 in a forward position blocking passage of the article A while the latter is within the confines of discharge slot 45. When, however, the cam 60 rotates to allow the lever 56 to lower the blade 55 into a downward position as shown in FIG. 4a, the spring 53 acts on the arm 49 to move the arm 50 so as to cause the foot 54 to withdraw from a blocking position at the slot 45 and thus free the article A for pasasge through the slot 45. In passing through the slot, the blade 55 applies pressure on the article A thereunder so as to assure delivery of the article A to the cavity 41 of the carrier in halted position below the slot.

A latch 62 mounted on a pivot 63 projecting from the wall 48 of the mounting bracket is thereby supported for swinging movement toward and away from the blade 55 in a path parallel to the path of the blade 55. A spring 64 seated in a pocket 65 provided in the mounting bracket wall 47 acts against the latch 62 to urge the latter to swing toward the blade 55. The pivot 63 presents a knife edge fulcrum so as to assure freedom of motion of latch between operative and inoperative positions. The lower end of the latch 62 is offset to provide a hook 66 which obstructs downward movement of the blade 55 when the latter is in upward position as shown in FIG. 4 and while the latch is undergoing pressure of the spring 64 to swing toward the blade 55. An adjusting screw 67 has engagement with the spring 64 to regulate the pressure exerted against the latch by the spring 64. The hook 66 presents an upright surface 68 against which an article A applies endwise pressure to overcome the resistance of the spring 64 and thereby withdraw the hook 66 from a position in obstructing relation to the blade 55. Thus the latch provides a sensing element responsive to arrival of an article A within the confines of the slot 45 which releases the blade 55 for movement to assist discharge of the article A to the carrier 10. Thus downward movement of the blade 55 is prevented pending arrival of an article A in accurate registry with the confines of the slot 45.

While the adjusting screw 67 thus provides for regulating the pressure exerted by spring 64, the screw also functions to limit the motion of the latch 66 so as to establish a selected position of the upright face 68 within a range to accommodate minor misalignment of the cavity 11 of carrier 10 lengthwise of the line of travel of the article A toward its discharge position.

The accumulation of any suppository material which might otherwise build up on the foot 54, the latch 62, the blade 55 and the area around the slot 45 is effectively prevented by means of a wattage heater installed within the mounting bracket, in connection with which electric current is supplied via conductors 69 shown in FIGS. 4, 4a and 5.

It will be seen that pivotal support provided by the shaft 29 allows the panel 32 and all accessories supported thereon to be raised for complete access to the turntable and the shelf 13 without disturbing any adjustment of such accessories.

Drive means for the shaft 17 which continuously rotates the turntable 20 and the drive means for the shaft 61 which continuously rotates the cam 60 through an arc at 360 degrees for each wrapping cycle of the article wrapping unit are powered by and synchronized with the drive means which operates the carrier between article receiving positions.

While there is given above a certain specific embodiment of this invention and its application in practical use, it should be understood that, as will readily appear to those skilled in the art, many changes and modifications may be made in said apparatus and accessory mechanisms without departing from this specification and the scope thereof as set forth in the appended claims.

What is claimed is:

1. Apparatus for sorting and feeding similarly sized articles, said apparatus having a turntable mounted for rotation in a predetermined direction about a fixed upright axis, said turntable having a line of travel within an open region around the center of said turntable bounded by a stationary wall against which articles while supported on said turntable within said region are driven by centrifugal force to group said articles in lined-up end-to-end relation along said wall, said wall being positioned above said turntable in non-concentric relation with said axis, a discharge station occupying a position radially beyond the line of travel of said turntable, a guideway communicating with the open region of said turntable via an opening in said wall, said guideway extending from said opening to said discharge station in the direction of movement of said turntable and in the line of travel of said turntable outside the confines of said wall whereby said articles while in lined-up end-to-end relation are moved to said discharge station via said guideway under force applied to said articles by rotation of said turntable, and means operative to control release of said article, one at a time, upon arrival at said discharge station.

2. Apparatus according to claim 1, wherein means operative to control release of said articles upon arrival at said discharge station includes a foot member supported for movement between an advanced position to define an underlying transitional support for an article within the confines of said discharge station and a retracted position to free said article for release action at said discharge station.

3. Apparatus according to claim 1, wherein means operative to control release of said articles upon arrival at said discharge station includes a discharge assistant supported for movement between a retracted position in overhead relation to an article within the confines of said discharge station and an advanced position effective to discharge said article from said discharge station via downward engagement with said article.

4. Apparatus according to claim 3, wherein a latch supported for movement between a latching position and a non-latching position has engagement with said discharge assistant to prevent movement of said assistant from retracted to advanced position when said latch is in latching position, said latch being movable from latching position to non-latching position via engagement of an article with said latch upon arrival of said article within the confines of said discharge station.

5. Apparatus according to claim 3, wherein said discharge assistant is biased for movement toward an advanced position and means operative to periodically move said discharge assistant from advanced to retracted position includes a rotating cam.

6. Apparatus according to claim 2, wherein a discharge assistant is supported for periodical movement between a retracted position in overhead relation to an article within the confines of said discharge station and an advanced position effective to discharge said article from said discharge station via downward engagement with said article, and said foot member is biased for movement toward a retracted position and said discharge assistant is operative to move said foot member to advanced position upon movement of said discharge assistant from advanced to retracted position.

7. Apparatus according to claim 1, wherein said wall is defined by the edge of an opening formed in a rigid panel member hinged for swinging movement about a fixed axis parallel to the path of rotation of said turntable, and said guideway is defined by a tunnel formed in said panel.

8. Apparatus for feeding articles to a rotating carrier having a series of article receiving cavities, said apparatus having an article discharge opening in fixed overhead relation to the line of travel of said article receiving cavities of the carrier through which opening an article has entry to the area occupied by an article receiving cavity, a foot member supported for movement between an advanced position providing underlying transitional support for an article within the confines of said discharge opening and a retracted position to free said article for entry to the area occupied by an article receiving cavity, a discharge assistant supported for movement between a retracted position in overhead relation to an article within the confines of said discharge opening and an advanced position effective to push said article through said opening and into an article receiving cavity therebelow, and said foot member is biased for movement toward a retracted position and said discharge assistant is operative to move said foot member to advanced position upon movement of said discharge assistant from advanced to retracted position, drive means operative to rotate said carrier to move said article receiving cavities in succession to a position in downwardly aligned relation to said discharge opening, and means operative to periodically move said discharge assistant from advanced to retracted position includes a rotating cam operating in timed relation with the movement of said carrier between a first position at which a selected article receiving cavity is in article receiving position below said discharge opening and a second position at which a next succeeding article receiving cavity is in article receiving position below said discharge opening, and latch means for preventing movement of said discharge assistant from retracted to advanced position pending arrival of an article within the confines of said discharge opening.

9. Apparatus according to claim 8, wherein a guideway defines a fixed line of travel along which an article is moved toward a position within the confines of said discharge opening, and said latch means includes a latch arm supported for swinging movement toward and away from said discharge assistant lengthwise of the line of article travel defined by said guideway, and said latch arm presents an upright surface with which an article has engagement upon arrival of said article at said discharge opening to cause said latch means to move away from said discharge assistant.

10. Apparatus according to claim 9, wherein the limit of swinging movement of said latch in a direction away from said discharge assistant is established by an adjustable stop.

References Cited

UNITED STATES PATENTS

| | | | |
|---|---|---|---|
| 1,358,044 | 11/1920 | Williams | 221—182 |
| 1,558,079 | 10/1925 | Duston et al. | 221—182 |
| 2,721,684 | 10/1955 | Heinl et al. | 221—251 XR |
| 3,174,614 | 3/1965 | Ponsen | 198—33 |
| 3,195,773 | 7/1965 | Hopkins | 221—251 XR |

WALTER SOBIN, *Primary Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,401,832 September 17, 1968

George V. Cremieux

It is certified that error appears in the above identified patent and that said Letters Patent are hereby corrected as shown below:

Column 1, line 35, "said" should read -- and --. Column 2, line 12, "switch" should read -- such --. Column 3, line 61, "slight" should read -- sight --. Column 4, line 41, "55 applies pressure on the article A thereunder so as to" should read -- 55 into an upward position as shown in Fig. 4. While in --.

Signed and sealed this 10th day of February 1970.

(SEAL)
Attest:

Edward M. Fletcher, Jr.
Attesting Officer

WILLIAM E. SCHUYLER, JR.
Commissioner of Patents